(12) United States Patent
Matsuura

(10) Patent No.: US 11,565,574 B2
(45) Date of Patent: Jan. 31, 2023

(54) AIR-CONDITIONING DEVICE

(71) Applicant: DENSO CORPORATION, Kariya (JP)

(72) Inventor: Yoichiro Matsuura, Kariya (JP)

(73) Assignee: DENSO CORPORATION, Kariya (JP)

( * ) Notice: Subject to any disclaimer, the term of this patent is extended or adjusted under 35 U.S.C. 154(b) by 444 days.

(21) Appl. No.: 16/780,693

(22) Filed: Feb. 3, 2020

(65) Prior Publication Data
US 2020/0171921 A1   Jun. 4, 2020

Related U.S. Application Data

(63) Continuation of application No. PCT/JP2018/025827, filed on Jul. 9, 2018.

(30) Foreign Application Priority Data

Aug. 23, 2017   (JP) .............................. JP2017-160364

(51) Int. Cl.
  *B60H 1/24*    (2006.01)
  *B60H 1/34*    (2006.01)
  *B60H 1/00*    (2006.01)

(52) U.S. Cl.
  CPC ............. *B60H 1/241* (2013.01); *B60H 1/248* (2013.01); *B60H 1/00028* (2013.01); *B60H 1/00664* (2013.01); *B60H 1/00671* (2013.01); *B60H 1/00835* (2013.01); *B60H 1/00864* (2013.01); *B60H 2001/3471* (2013.01)

(58) Field of Classification Search
  CPC .......... B60H 1/24; B60H 1/241; B60H 1/242; B60H 2001/3471; B60H 1/00835; B60H 1/00857; B60H 1/00842; B60H 1/00828

USPC .......................... 454/141, 145, 151–152, 155
See application file for complete search history.

(56) References Cited

U.S. PATENT DOCUMENTS

| | | | |
|---|---|---|---|
| 2003/0178257 A1* | 9/2003 | Oh ...................... | F24F 13/1426 74/625 |
| 2006/0068694 A1* | 3/2006 | Tajiri ................. | B60H 1/00685 454/152 |
| 2011/0072925 A1* | 3/2011 | Ikeda ...................... | F16H 55/17 74/412 R |
| 2014/0045417 A1 | 2/2014 | Sakamoto et al. | |
| 2017/0106722 A1* | 4/2017 | Nolta ................. | B60H 1/00857 |

(Continued)

FOREIGN PATENT DOCUMENTS

| | | |
|---|---|---|
| JP | S56155131 A | 12/1981 |
| JP | 200522595 A | 1/2005 |

(Continued)

*Primary Examiner* — Ko-Wei Lin
(74) *Attorney, Agent, or Firm* — Harness, Dickey & Pierce, P.L.C.

(57) ABSTRACT

The present disclosure provides a power transmission device in which stress is reduced and a vehicle air-conditioning device. An air-conditioning device has an inside/outside air door. A power transmission device drives the inside/outside air door. The power transmission device has a motor, a gear train, and a cam mechanism. A first gear of the gear train provides a rotatable member. A plurality of lock mechanisms is provided, which stops a rotation of the first gear at one end and/or the other end in a rotation direction of the first gear. The plurality of lock mechanisms provide a plurality of contacts between the first gear and a stationary link cover.

12 Claims, 9 Drawing Sheets

(56) References Cited

U.S. PATENT DOCUMENTS

2018/0328599 A1* 11/2018 Lin .................... F24F 13/1426
2020/0171921 A1* 6/2020 Matsuura ............... B60H 1/241

FOREIGN PATENT DOCUMENTS

| JP | 2011057080 A | 3/2011 |
| JP | 2012224197 A | 11/2012 |

* cited by examiner

AIR-CONDITIONING DEVICE

CROSS REFERENCE TO RELATED APPLICATIONS

The present application is a continuation application of International Patent Application No. PCT/JP2018/025827 filed on Jul. 9, 2018, which designated the U.S. and claims the benefit of priority from Japanese Patent Application No. 2017-160364 filed in Japan filed on Aug. 23, 2017, the entire disclosure of the above application is incorporated herein by reference.

TECHNICAL FIELD

Disclosure in this specification relates to a power transmission device and an air-conditioning device.

BACKGROUND ART

An air-conditioning device has a plurality of elements called doors or dampers to regulate an air flow. The air-conditioning device uses a manual force by a user or a driving force by an electric motor to move these elements.

SUMMARY

An air-conditioning device is provided. The air-conditioning device comprises: a door which controls flow of air; a power source which generates power for moving the door; and a power transmission device disposed between the power source and the door. The power transmission device includes: a rotatable member which is rotatable; a stationary member arranged adjacent to the rotatable member; and a plurality of lock mechanisms which stop a rotation of the rotatable member by a plurality of contacts between the rotatable member and the stationary member at one end and/or the other end in a rotation direction of the rotatable member. The rotatable member is one of two gears meshing with each other.

According to the disclosed air-conditioning device, the plurality of lock mechanisms provide a plurality of contacts. The stress when the rotatable member is stopped is distributed to a plurality of contacts. For this reason, stress does not concentrate on one contact part of the rotatable member and the stationary member. The stress applied to one contact is suppressed. A dispersion of the stress suppresses a deformation of the rotatable member or the stationary member.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

DESCRIPTION OF EMBODIMENT

Figure 1:
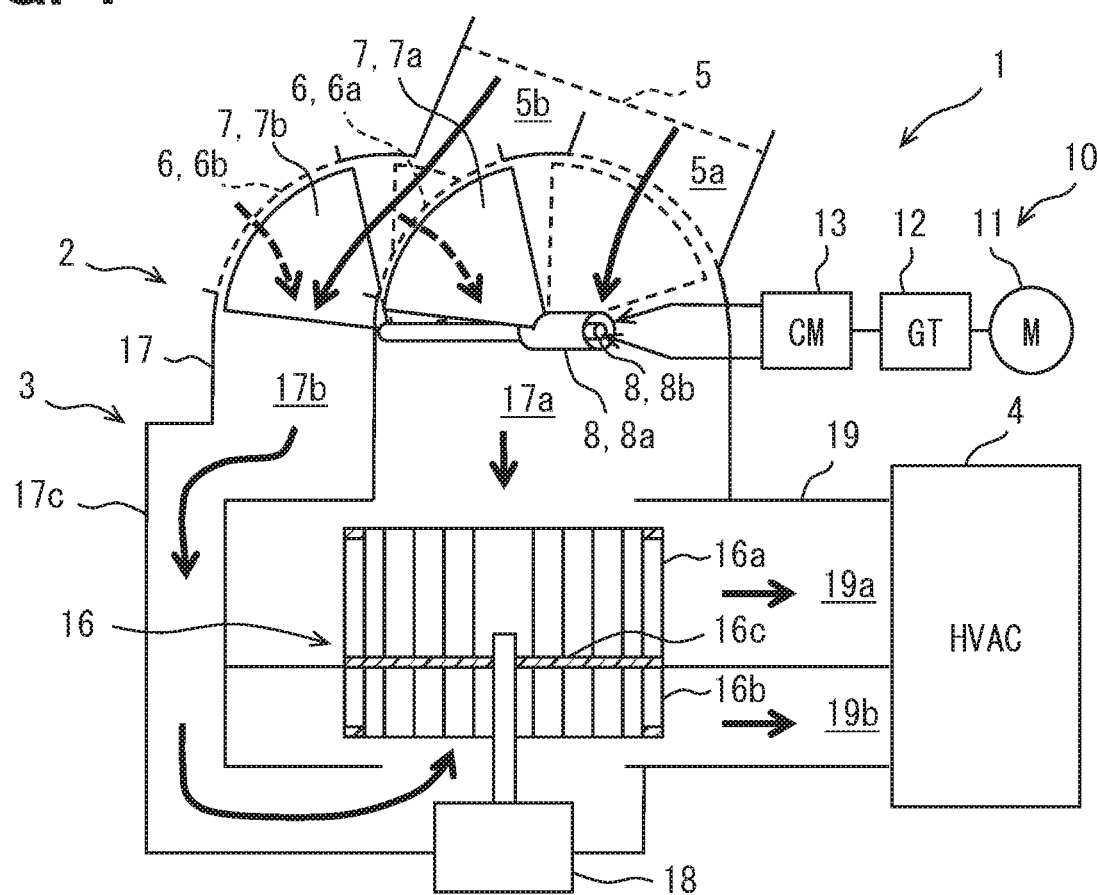
FIG. 1 is a schematic cross-sectional view of an air-conditioning device.

A plurality of embodiments will be described with reference to the drawings. In some embodiments, parts that are functionally and/or structurally corresponding and/or associated are given the same reference numerals, or reference numerals with different hundreds digit or higher digits. For corresponding parts and/or associated parts, reference can be made to the description of other embodiments.

First Embodiment

In FIG. 1, the first embodiment provides an air-conditioning device 1. The air-conditioning device 1 is for vehicles. The air-conditioning device 1 is mounted on a vehicle and air-conditions a passenger compartment of the vehicle. The vehicle is a car. Note that the term "vehicle" includes an airplane, a ship, a private room for games, and the like. The vehicle air-conditioning device 1 is a so-called multi-flow unit that generates a plurality of air flows. For example, the multi-flow unit gives a difference in temperature, air volume, and the like to the air provided above and below the room. This multi-flow unit is also called a two-layer unit including a first layer or an upper layer and a second layer or a lower layer. About a multi-flow unit, disclosure of Patent Documents 1 and Patent Documents 2 may be used by reference.

The vehicle air-conditioning device 1 includes an inside/outside air switching device 2, a blower 3, and an air condition device 4 (HVAC). The inside/outside air switching device 2 and the blower 3 provide an air introduction unit of the vehicle air-conditioning device 1. The inside/outside air switching device 2 and the blower 3 are a so-called multi-flow unit that creates a plurality of air flows. The air condition device 4 receives air from the blower 3 and provides a passage for blowing the air into the room. The air condition device 4 provides at least one of heating, ventilation, and cooling. The air condition device 4 is a so-called multi-flow unit that creates a plurality of air flows.

The inside/outside air switching device 2 has an outside air inlet 5 and an inside air inlet 6. The outside air inlet 5 is provided by a duct communicating with an outside of the vehicle. The inside air inlet 6 opens directly into the vehicle. The air introduced from the outside air inlet 5 is also called a fresh air. The air introduced from the inside air inlet 6 is also called a recirculate air.

The inside/outside air switching device 2 includes an inside/outside air door 7. The inside/outside air door 7 provides a door for controlling the air flow. The inside/outside air door 7 can at least switch between an inside air of the vehicle and an outside air of the vehicle. Further, the inside/outside air adjusting door 7 may adjust a ratio of opening areas between the outside air inlet 5 and the inside air inlet 6. The inside/outside air switching device 2 has a movable member 8. The movable member 8 defines a rotation axis AX8. The movable member 8 can rotate about the rotation axis AX8. The movable member 8 provides a drive mechanism for rotating the inside/outside air adjusting door 7. When the inside/outside air door 7 is at a position illustrated by a solid line, the inside/outside air door 7 opens the outside air inlet 5 and closes the inside air inlet 6. When the inside/outside air door 7 is in a position illustrated by a broken line, the inside/outside air door 7 closes the outside air inlet 5 and opens the inside air inlet 6.

The inside/outside air switching device 2 has a power transmission device 10 for driving the movable member 8. The power transmission device 10 includes a motor 11 (M), a gear train 12 (GT), and a cam mechanism 13 (CM). The power transmission device 10 is provided between the motor 10 and the inside/outside air door 7. The cam mechanism 13 is also called a cam link mechanism or a link mechanism. The motor 11 is a power source that generates power for moving the inside/outside air door 7. The motor 11 is provided by a servo motor. The power source may be a manual operation device operated by a user. The gear train 12 includes at least two gears. The gear train 12 transmits the rotation of the motor 11 to the cam mechanism 13.

The blower 3 has a fan 16. The fan 16 is also called an impeller. The fan 16 sucks air from an end portion in the axial direction and blows air outward in the radial direction. The blower 3 has a case 17. The case 17 is also a case of the inside/outside air switching device 2. The case 17 provides a passage from the inside/outside air switching device 2 to the air condition device 4 via the blower 3. The blower 3 has a motor 18 for rotating the fan 16. The blower 3 has a blowing duct 19 that provides a blowing passage.

The inside/outside air switching device 2 includes elements for a first layer and elements for a second layer. The elements for the first layer include a first outside air inlet 5*a*, a first inside air inlet 6*a*, a first inside/outside air door 7*a*, and a first movable member 8*a*. The elements for the second layer include a second outside air inlet 5*b*, a second inside air inlet 6*b*, a second inside/outside air door 7*b*, and a second movable member 8*b*. The blower 3 also includes elements for the first layer and elements for the second layer. The elements for the first layer include a first fan 16*a*, a first suction passage 17*a*, and a first outlet passage 19*a*. The elements for the second layer include a second fan 16*b*, a second suction passage 17*b*, and a second outlet passage 19*b*.

The first inside/outside air door 7*a*, the first movable member 8*a*, the second inside/outside air door 7*b*, and the second movable member 8*b* constitute a unit that can be handled as an integral unit. The first movable member 8*a* and the second movable member 8*b* can rotate about a common rotation axis AX8. The first movable member 8*a* and the second movable member 8*b* can be provided by a plurality of members which are arranged in an inside and outside double layered manner and which can be rotated independently of each other. The power transmission device 10 drives the first movable member 8*a* and the second movable member 8*b* according to a predetermined drive pattern.

The first fan 16*a* and the second fan 16*b* are provided by an integral molding method using a continuous resin. The fan 16 has a partition wall 16*c* between the first fan 16*a* and the second fan 16*b*. The partition 16*c* partitions the first layer and the second layer. The partition wall 16*c* is provided by integral molding of a resin continuous with the first fan 16*a* and the second fan 16*b*.

A fresh air and/or a circulate air taken from the inside/outside air switching device 2 is supplied to the air condition device 4 by the blower 3. The air for the first layer flows from the first suction passage 17*a* through the first fan 16*a* to the first blowing passage 19*a*. The air for the second layer flows from the second suction passage 17*b* through the second fan 16*b* to the second blowing passage 19*b*. The second suction passage 17*b* is arranged so as to go around the blower 3.

Figure 2:
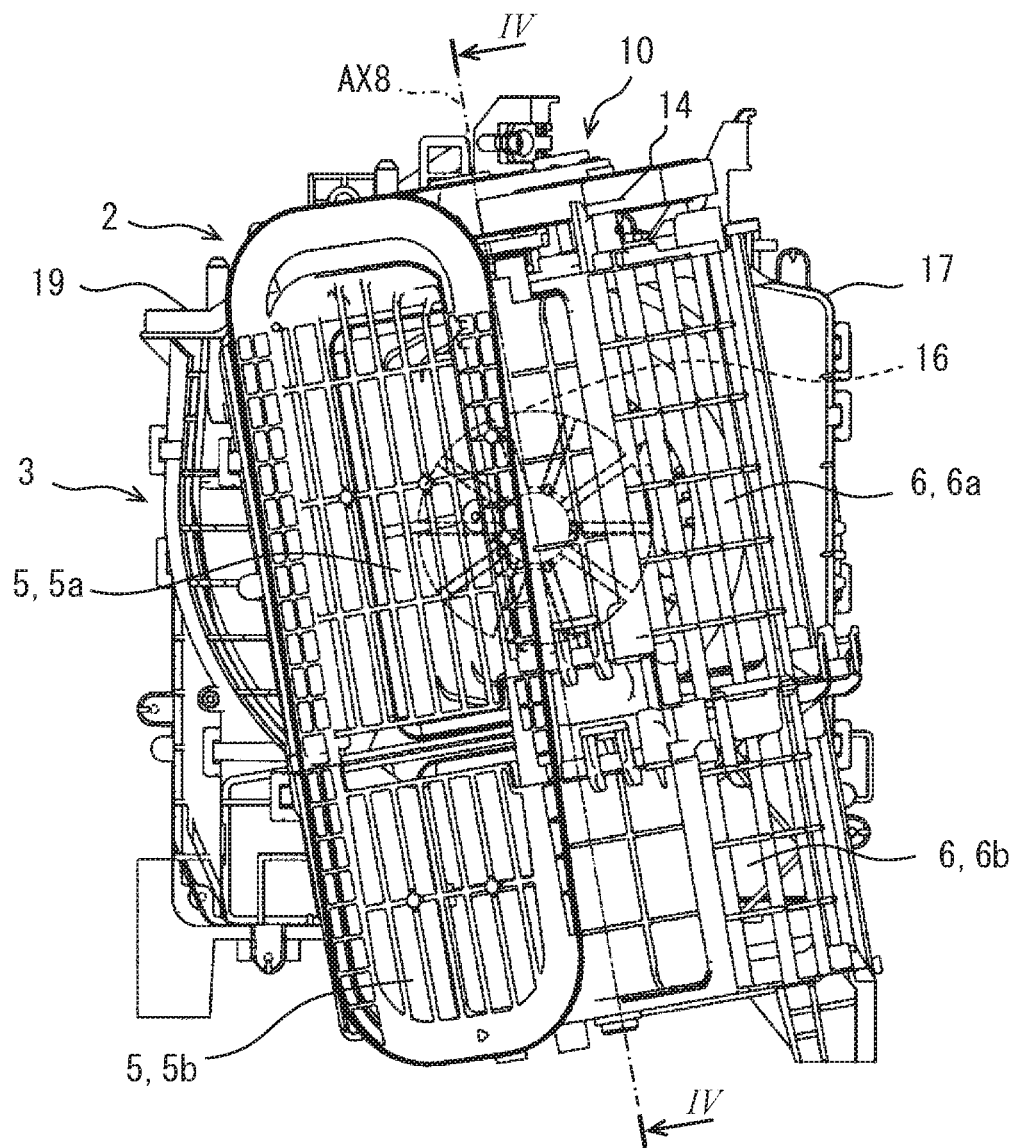
FIG. 2 is a plan view showing an appearance of an introduction unit.

FIG. 2 shows an appearance of the introduction unit when the blower 3 is viewed from the inside/outside air switching device 2. The first outside air inlet 5*a* and the second outside air inlet 5*b* are arranged adjacent to each other so as to open into one duct. The first inside air inlet 6*a* and the second inside air inlet 6*b* are also arranged adjacent to each other. The fan 16 and the elements for the first layer provided by the first outside air inlet 5*a* and the first inside air inlet 6*a* are arranged substantially on a straight line. On a surface of the drawing, the blowing duct 19 extends upward.

The power transmission device 10 is fixed to one end of the inside/outside air switching device 2. The power transmission device 10 is fixed to the case 17. The case 17 is mainly made of resin. A fixing method of the power transmission device 10 is provided by a fixing method by using a snap-fitting of resin members and a fixing method by using a tightening of a plurality of resin members by a plurality of screws. The power transmission device 10 includes a link cover 14 for covering a rotatable member which rotates. The link cover 14 is fixed to the case 17.

Figure 3:
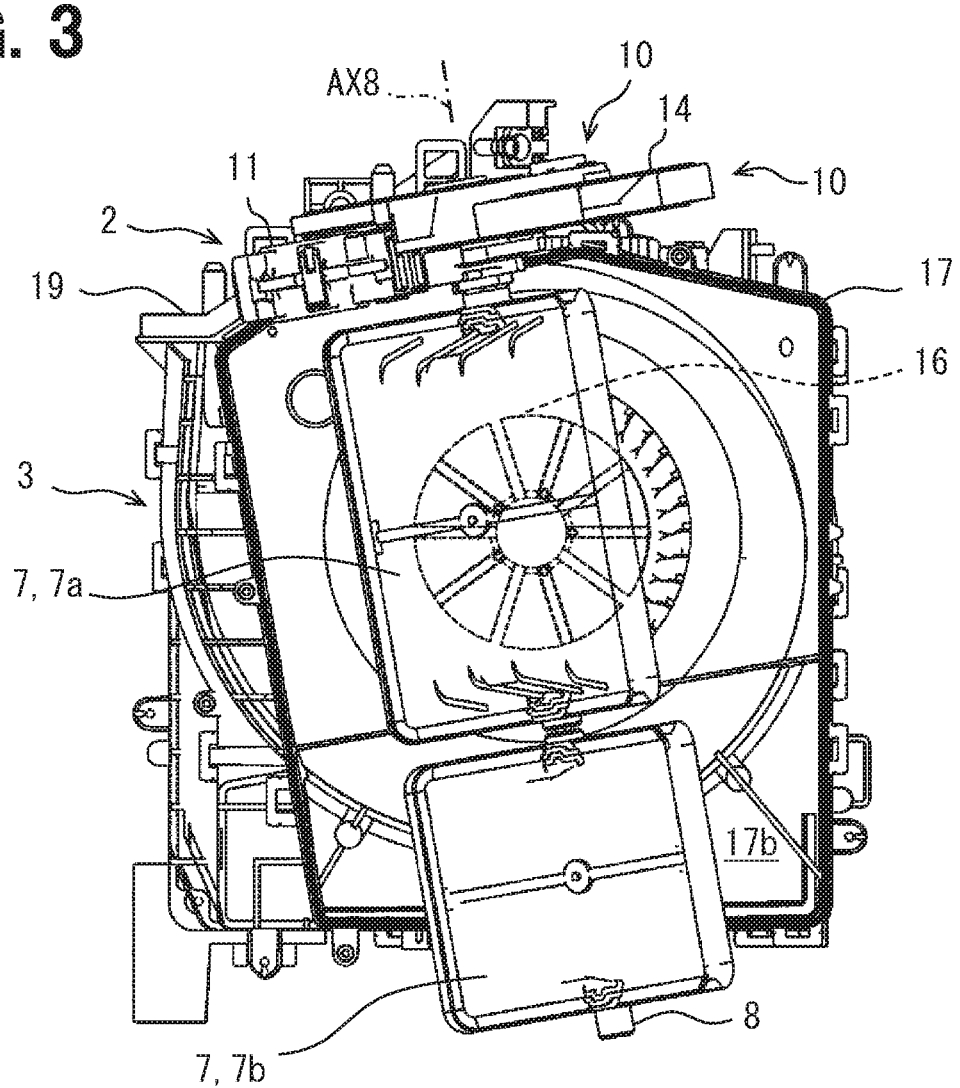
FIG. 3 is a plan view showing a state where a part of a case is removed.
Figure 4:
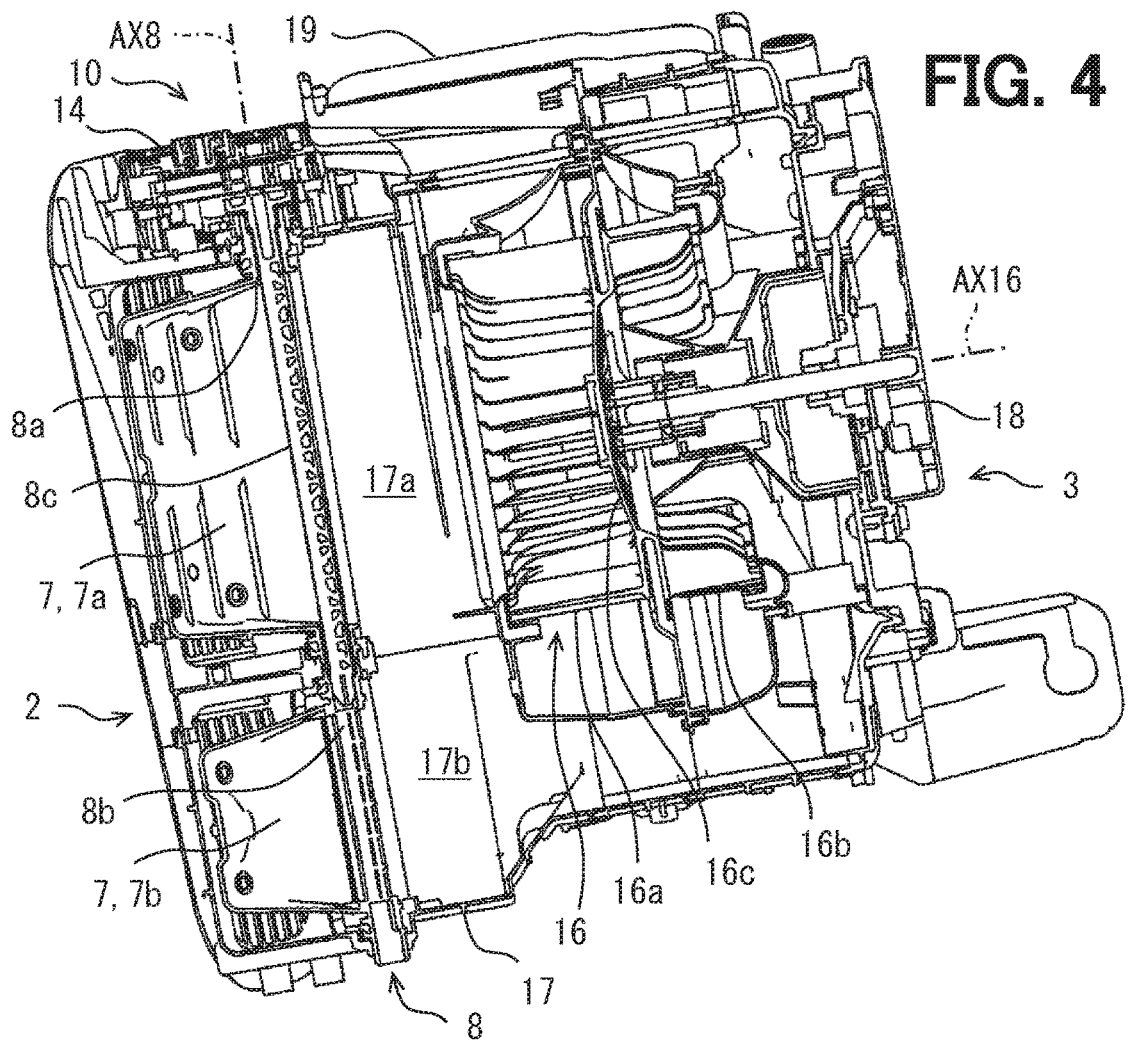
FIG. 4 is a cross-sectional view on a line IV-IV in FIG. 2.

FIG. 3 shows a state in which a part of the case 17, in particular, a cover that provides the inside/outside air switching device 2 is removed. FIG. 4 shows a cross section on a line IV-IV in FIG. 2. Since the cross sectional width of the resin member is narrow, hatching is omitted.

The fan 16 rotates about a rotation axis AX16. The air that has passed through the first inside/outside air door 7*a* is sucked straight from one end of the fan 16. The air that has passed through the first inside/outside air door 7*a* is sucked into the first fan 16*a* and blown out.

The air that has passed through the second inside/outside air door 7*b* is sucked from the other end of the fan 16 through the second suction passage 17*b*. The air that has passed through the second inside/outside air door 7*b* is sucked into the second fan 16*b* and blown out. The second suction passage 17*b* extends through the outside of the scroll case of the blower 3. The second suction passage 17*b* extends from one end of the fan 16 to the other end of the fan 16 so as to go around.

The movable member 8 extends between one end and the other end of the inside/outside air switching device 2. The movable member 8 has a plurality of movable members arranged in a multiple inside and outside layered manner. Accordingly, the first inside/outside air door 7*a* and the second inside/outside air door 7*b* rotate around the common rotation axis AX8.

The movable member 8 defines a rotation axis AX8 for the first inside/outside air door 7*a*, and includes a first movable member 8*a* that is supported by the case 17 in a rotatable manner. The first movable member 8*a* is a hollow cylindrical member. The first movable member 8*a* is provided by two members disposed apart from both ends of the first inside/outside air door 7a. The first inside/outside air door 7a and the first movable member 8a are provided by an integral molding method using a continuous resin. The first movable member 8a may be provided by a series of hollow cylindrical members. The first movable member 8a can be driven from one end of the inside/outside air switching device 2.

The movable member 8 defines a rotation axis AX8 for the second inside/outside air door 7b, and includes a second movable member 8b that is supported by the case 17 in a rotatable manner. The second movable member 8b is a hollow cylindrical member. The second movable member 8b is provided by two hollow cylindrical parts disposed on the both ends of the second inside/outside air door 7b, and a shaft which connects them. The second inside/outside air door 7b and the second movable member 8b are provided by an integral molding method using a continuous resin.

The movable member 8 has a connecting shaft 8c. The connecting shaft 8c functions as a part of the second movable member 8b. The connecting shaft 8c extends so as to penetrate through the first movable member 8a. The connecting shaft 8c is connected to the second movable member 8b. The second movable member 8b can be driven from one end of the inside/outside air switching device 2 via the connecting shaft 8c. Thereby, both the first movable member 8a and the second movable member 8b can be independently operated from one end side of the inside/outside air switching device 2.

Figure 5:
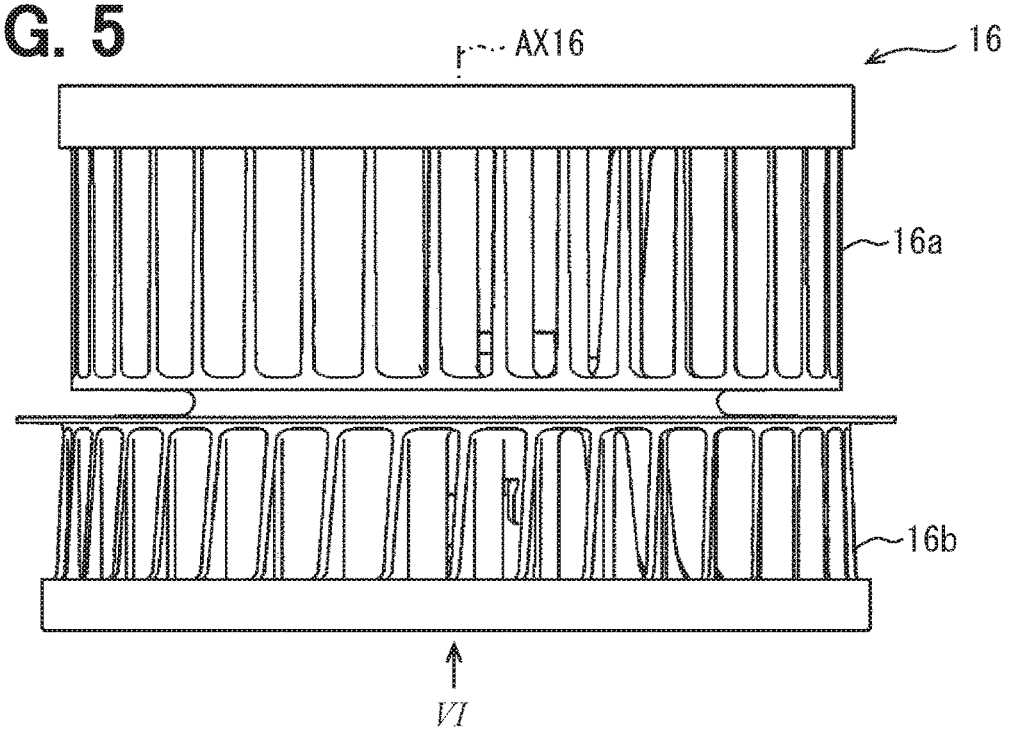
FIG. 5 is a plan view of a fan.

FIG. 5 shows an external appearance of the fan 16. The fan 16 has a plurality of blades. The fan 16 is integrally formed by a continuous resin so as to connect the first fan 16a and the second fan 16b on a common rotation axis AX16. The fan 16 is a so-called sirocco fan.

Figure 6:
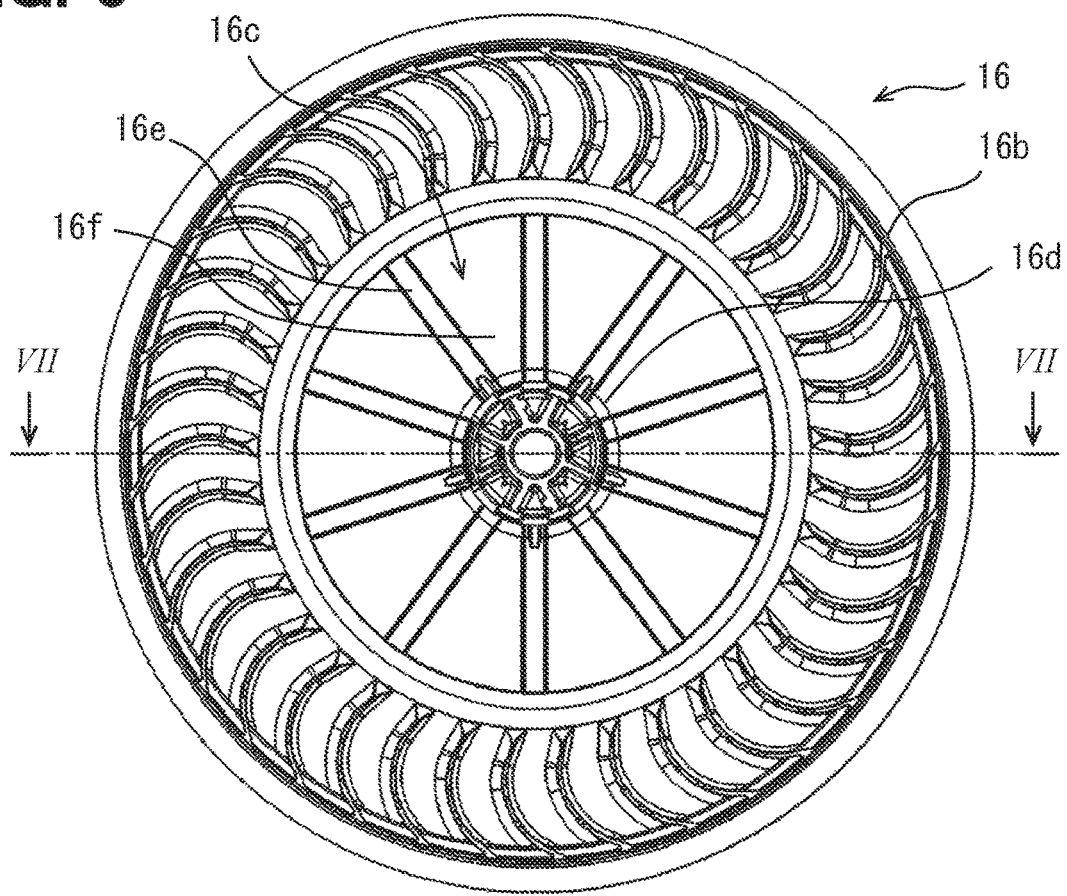
FIG. 6 is a bottom view of the fan of FIG. 5.
Figure 7:
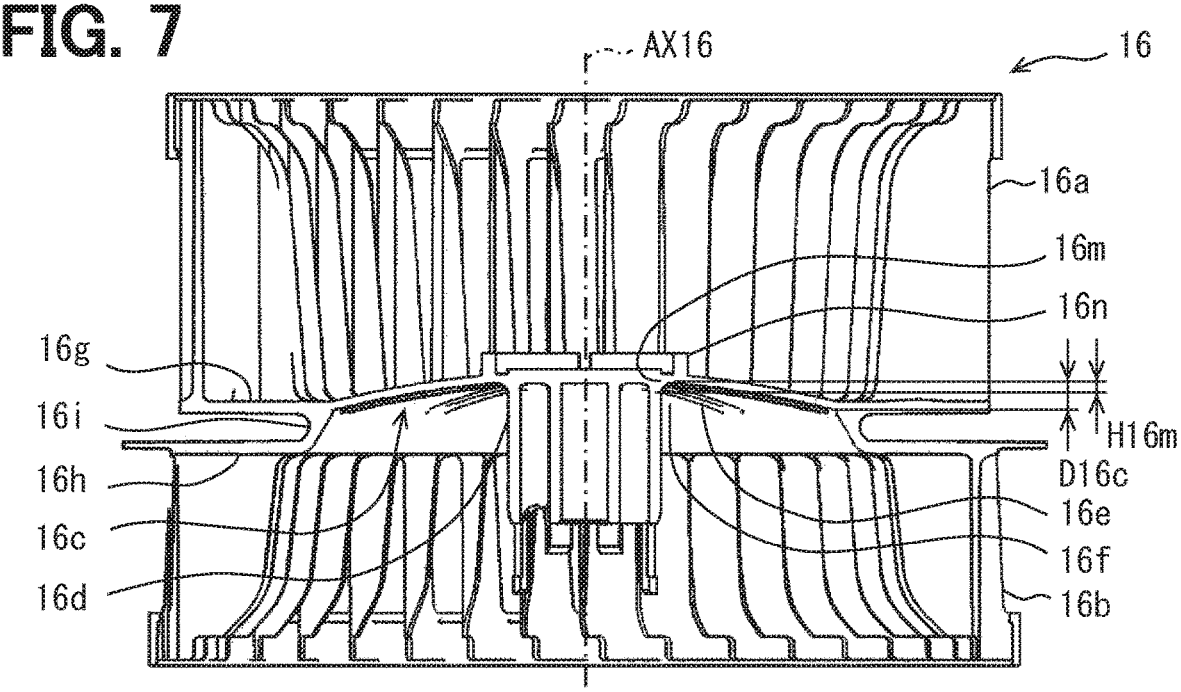
FIG. 7 is a cross-sectional view on a line VII-VII in FIG. 6.

FIG. 6 shows a view along an arrow VI of the fan in FIG. 5. FIG. 7 shows a cross section on a line VII-VII in FIG. 6. The partition wall 16c is curved so as to protrude from the second fan 16b toward the first fan 16a. The partition wall 16c has a dome shape. The fan 16 has a boss portion 16d on the rotation axis AX16. The boss portion 16d is used to connect the fan 16 and the rotation shaft of the motor 18.

The partition wall 16c has a plurality of ribs 16e and a plurality of film-like portions 16f. The plurality of ribs 16e extend radially from a center, i.e., the boss portion 16d. The plurality of film-like portions 16f are provided between the plurality of ribs 16e. The film-like portion 16f extends in a substantially triangular range. The plurality of ribs 16e and the plurality of film-like portions 16f are provided by an integral molding method using a continuous resin.

The plurality of ribs 16e are provided by protruding a surface on a side of the second fan 16b among the both surfaces provided by the partition wall 16c. The plurality of ribs 16e are not protruded on the surface on a side of the second fan 16b. In other words, the plurality of ribs 16e are provided only on the inner surface of the dome-shaped partition 16c.

The fan 16 has an annular and plate-like first bottom wall 16g for the first fan 16a. The first bottom wall 16g is also a bottom wall that connects a plurality of blades. The fan 16 has an annular and plate-like second bottom wall 16h for the second fan 16b. The second bottom wall 16h is also a bottom wall that connects a plurality of blades. The first bottom wall 16g and the second bottom wall 16h are arranged in parallel to each other and separated from each other in the direction of the rotation axis AX16. Therefore, a predetermined gap is formed between the first bottom wall 16g and the second bottom wall 16h.

Further, the fan 16 has a connecting wall 16i which connects a radially inner edge of the first bottom wall 16g and a radially inner edge of the second bottom wall 16h. The connecting wall 16i smoothly connects the first bottom wall 16g and the second bottom wall 16h. The connecting wall 16i is a wall that can also be called a substantially cylindrical shape. The connecting wall 16i has a smooth curved surface facing radially outward. The connecting wall 16i has a slope on a radially inner side. The slope provides a cylindrical inner surface whose inner diameter gradually decreases from the second fan 16b toward the first fan 16a. The slope provides an outer annular portion of the dome-shaped inner surface.

The partition wall 16c transitions from the partition wall 16c to the first bottom wall 16g toward a radially outer side. The partition wall 16c transitions radially outward from the partition wall 16c via the connecting wall 16i to the second bottom wall 16h. Therefore, the partition wall 16c can also be called an extended portion of the first bottom wall 16g. It can be said that the partition wall 16c is shifted toward a side to the first bottom wall 16g among the first bottom wall 16g and the second bottom wall 16h.

The plurality of ribs 16e are radially outward from the boss portion 16d. The plurality of ribs 16e are provided only on the partition wall 16c. The plurality of ribs 16e are on the radially inner side of the connecting wall 16i.

The plurality of ribs 16e have ten ribs 16e. The plurality of ribs 16e are arranged on five diameters. The plurality of ribs 16e are arranged at equal intervals. The interval between the plurality of ribs 16e is 36 degrees. A width in the circumferential direction of one rib 16e is sufficiently smaller than the interval between them. The width in the circumferential direction of one rib 16e is constant along the radial direction.

A thickness of the plurality of ribs 16e in the direction along the rotation axis AX16 of the fan 16 is larger than the thickness of the plurality of film-like portions 16f. The thickness of the plurality of ribs 16e is constant along the radial direction. However, the plurality of ribs 16e are slightly thicker along the wall of the boss portion 16d at a contact portion 16m with the boss portion 16d. The rib 16e has a maximum thickness H16m at the contact portion 16m. The partition wall 16c has a depth D16c provided by the dome shape. The thickness H16m is smaller than the depth D16c (H16m<D16c). This relationship may be provided when the connecting wall 16i is considered as a part of the partition wall 16c. The contact portion 16m is formed on the radially inner side with respect to the partial annular protrusion 16n formed on the opposite side of the boss portion 16d.

A shape of the partition wall 16c reduces a rigidity of the fan 16. A relatively low contact portion 16m reduces rigidity in the direction of the rotation axis AX16. On the other hand, a multiple ribs 16e more than three provide a required rigidity in the direction of rotation. The shape of the partition wall 16c contributes to lowering a resonance frequency of the fan 16 with respect to the motor 18. The small contact portion 16m contributes to lowering the resonance frequency. The shape of the partition wall 16c suppresses a resonance of the fan 16 with respect to the magnetic sound of the motor 18. Here, the resonance in a band most frequently used as the rotational speed of the fan 16 is suppressed. The shape of the partition wall 16c contributes to shift the natural frequency of the motor 18 and the natural frequency of the fan 16. The shape of the partition wall 16c contributes to separate the natural frequency of the motor 18 and the natural frequency of the fan 16 from each other. Thereby, the noise which a user can hear is suppressed.

Figure 8:
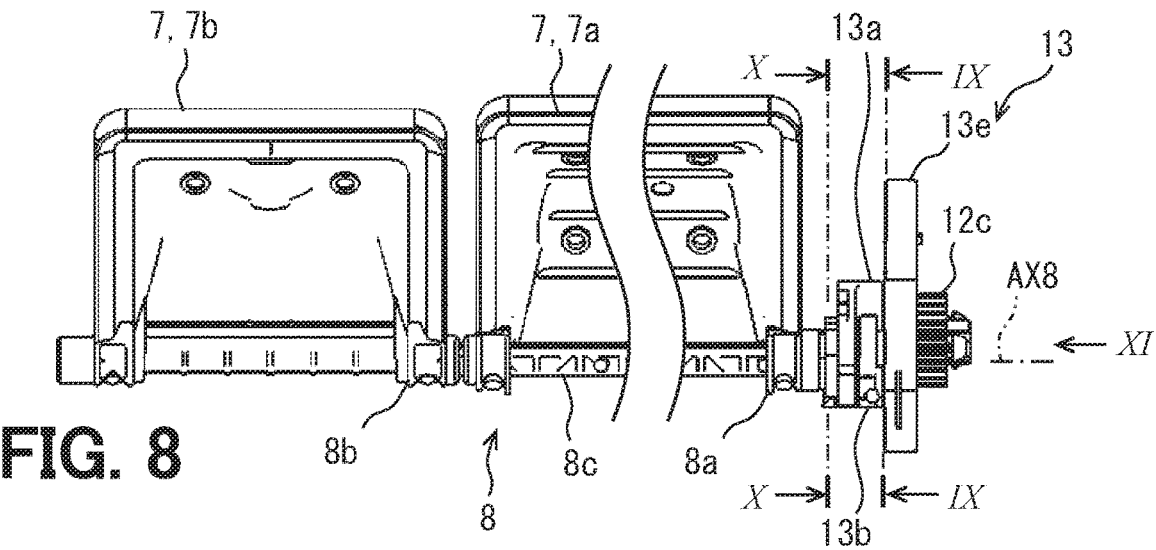
FIG. 8 is a plan view of a door unit.

FIG. 8 shows a door unit including the door 7, the movable member 8, and the cam mechanism 13. The cam mechanism 13 is attached to one end of the movable member 8. The cam mechanism 13 has a first arm 13*a*. The first arm 13*a* is connected to the first movable member 8*a* with respect to the rotation direction. The cam mechanism 13 has a second arm 13*b*. The second arm 13*b* is connected to the second movable member 8*b* via the connecting member 8*c* in the rotation direction.

The cam mechanism 13 has a cam plate 13*e*. The cam plate 13*e* has a plurality of cam grooves not shown. The cam plate 13*e* has a final gear 12*c* of the gear train 12. The cam plate 13*e* and the final gear 12*c* are integrally formed by a continuous resin. Therefore, the gear train 12 rotates the cam plate 13*e*. The cam mechanism 13 rotates the movable member 8.

Figure 9:
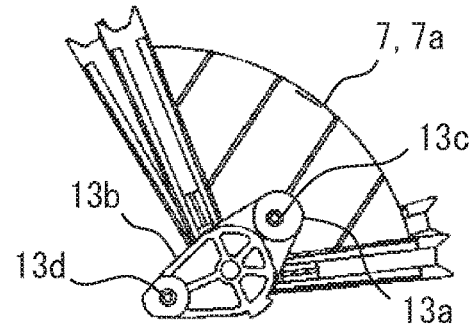
FIG. 9 is a cross-sectional view on a line IX-IX in FIG. 8.

FIG. 9 shows a cross section on a line IX-IX in FIG. 8. The first arm 13*a* has a first cam follower 13*c*. The second arm 13*b* has a second cam follower 13*d*. The cam followers 13*c* and 13*d* are arranged in the cam groove of the cam plate 13*e*.

Figure 10:
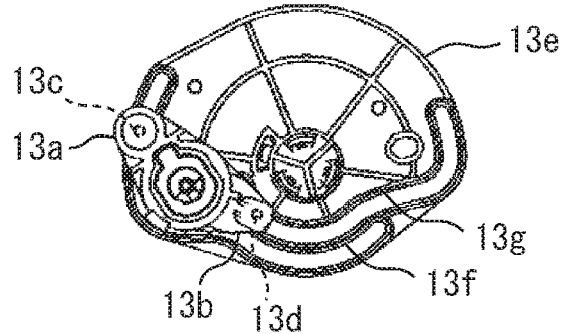
FIG. 10 is a cross-sectional view on a line X-X of FIG. 8.

FIG. 10 shows a cross section on a line X-X in FIG. 8. FIG. 10 shows the cam mechanism 13. The cam plate 13*e* has a first cam groove 13*f* and a second cam groove 13*g*. The first cam follower 13*c* of the first arm 13*a* is arranged in the first cam groove 13*f*. The second cam follower 13*d* of the second arm 13*b* is arranged in the second cam groove 13*g*.

A rotation trajectory of the first cam follower 13*c* is limited around the rotation axis AX8 by the first movable member 8*a*. On the other hand, the first cam follower 13*c* moves along the first cam groove 13*f*. As a result, the rotational position of the first movable member 8*a* is defined by the first cam groove 13*f*. The rotation position of the first movable member 8*a* is the position of the first inside/outside air door 7*a*. Therefore, the position of the first inside/outside air door 7*a* is controlled by the first cam groove 13*f*.

A rotation trajectory of the second cam follower 13*d* is limited around the rotation axis AX8 by the second movable member 8*b*. On the other hand, the second cam follower 13*d* moves along the second cam groove 13*g*. As a result, the rotational position of the second movable member 8*b* is defined by the second cam groove 13*g*. The rotation position of the second movable member 8*b* is the position of the second inside/outside air door 7*b*. Therefore, the position of the second inside/outside air door 7*b* is controlled by the second cam groove 13*g*.

The cam mechanism 13 converts the rotation angle of the cam plate 13*e* into the rotation angle of the movable member 8. The cam mechanism 13 converts the rotation angle of the cam plate 13*e* into the rotation angle of the first movable member 8*a* by the first cam groove 13*f* and the first cam follower 13*c*. The cam mechanism 13 converts the rotation angle of the cam plate 13*e* into the rotation angle of the second movable member 8*b* by the second cam groove 13*g* and the second cam follower 13*d*. As a result, the first inside/outside air door 7*a* and the second inside/outside air door 7*b* move to positions corresponding to the rotation angle of the cam plate 13*e*. The conversion by the cam mechanism 13 is not a uniform proportional relationship. The conversion by the cam mechanism 13 is a relationship such that a maximum value and a minimum value are created within a predetermined rotation angle range.

Figure 11:
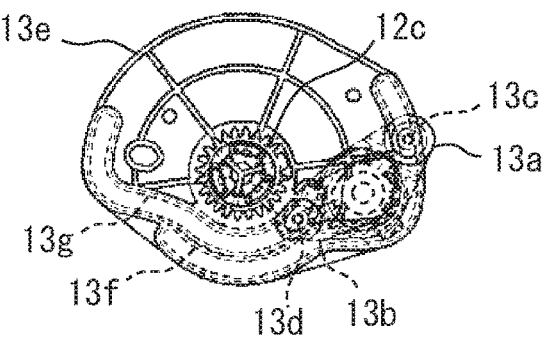
FIG. 11 is a plan view showing a cam mechanism.

FIG. 11 shows the cam mechanism 13. It illustrates the opposite surface of the cam plate 13*e* in FIG. 10. The cam grooves 13*f* and 13*g* are illustrated by broken lines.

Figure 12:
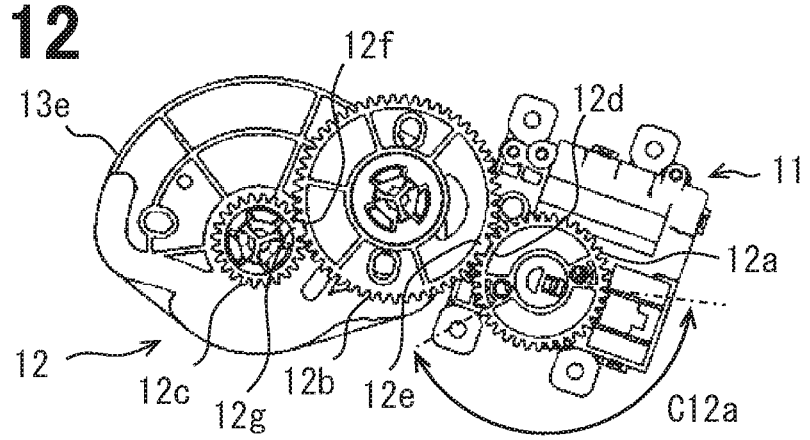
FIG. 12 is a plan view showing a gear train mechanism.

FIG. 12 shows the gear train 12. The gear train 12 is a mechanism that transmits the rotation of the motor 11 to the cam plate 13*e*. The gear train 12 includes three gears. The gear train 12 includes a first gear 12*a*, an intermediate gear 12*b*, and a final gear 12*c*. The motor 11 is provided by a servo motor. The servo motor has a block-shaped housing as illustrated. The servo motor is fixed to the case 17 by a bracket.

The first gear 12*a* is also called a pinion gear, a drive gear, or an input gear. The first gear 12*a* rotates together with the motor 11. The first gear 12*a* is connected to and supported by an output shaft of the motor 11. The connection between the first gear 12*a* and the output shaft is provided by a D-shaped fit and a snap fit. The first gear 12*a* is connected to the output shaft by a snap fit using the elastic deformation of the first gear 12*a* made of resin. The first gear 12*a* is rotatable over a range of an angular range C12*a* along the rotation direction of the first gear 12*a*. The first gear 12*a* has an arc-shaped groove extending over the angular range C12*a*. Both ends of the groove are terminated by surfaces facing the rotation direction of the first gear 12*a*.

The final gear 12*c* is also called an output gear. The final gear 12*c* rotates with the cam plate 13*e*. The final gear 12*c* is supported by the link cover 14 in a rotatable manner. The final gear 12*c* is fitted into the link cover 14 by a snap fit using an elastic deformation of the final gear 12*c* made of resin. As a result, the cam plate 13*e* is also supported by the link cover 14 in a rotatable manner.

The intermediate gear 12*b* meshes with the first gear 12*a*. The intermediate gear 12*b* is also called a reduction gear. The intermediate gear 12*b* meshes with the final gear 12*c*. The intermediate gear 12*b* transmits the rotation of the first gear 12*a* to the final gear 12*c*. The intermediate gear 12*b* is supported by a link cover 14 described later in a rotatable manner. The intermediate gear 12*b* is fitted into the link cover 14 by a snap fit using an elastic deformation of the intermediate gear 12*b* made of resin.

The gear train 12 has a positioning portion for defining an initial position in an assembling process. The positioning portion is provided by a wide groove 12*d* of the first gear 12*a*, a wide tooth 12*e* of the intermediate gear 12*b*, a wide groove 12*f* of the intermediate gear 12*b*, and a wide tooth 12*g* of the final gear 12*c*. The first gear 12*a* provides a rotatable member. The first gear 12*a* is one of two gears meshing with each other.

Figure 13:
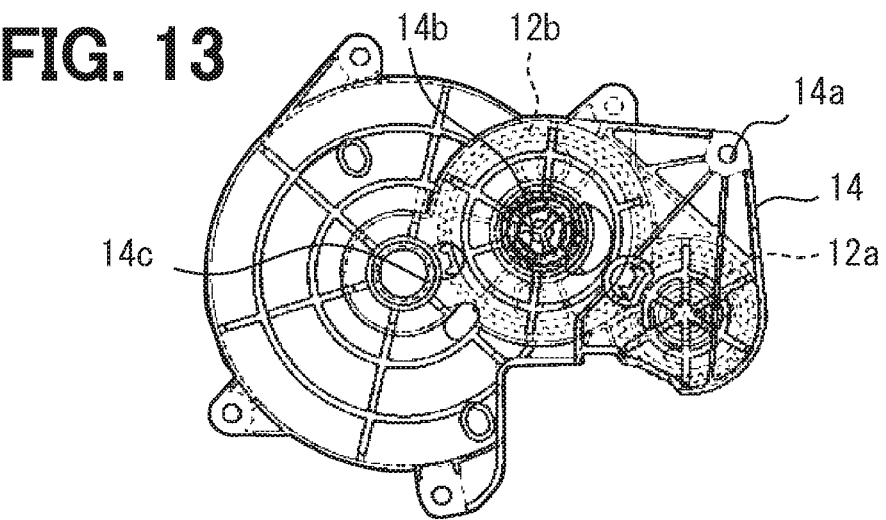
FIG. 13 is a plan view showing a link cover.

FIG. 13 shows an appearance of the link cover 14. The link cover 14 is fixed to the case 17 so as to cover the gear train 12 and the cam mechanism 13. Therefore, the link cover 14 provides a stationary member arranged adjacent to the first gear 12*a*. The link cover 14 is fixed to the case 17 with a plurality of screws. The link cover 14 has a plurality of through holes 14*a* for receiving screws. The link cover 14 has a receiving hole 14*b* and a receiving hole 14*c*. The receiving hole 14*b* receives a fitting part of the intermediate gear 12*b*. The receiving hole 14*b* supports the intermediate gear 12*b* so as to be rotatable. The receiving hole 14*c* receives a fitting portion of the final gear 12*c*. The receiving hole 14*c* supports the final gear 12*c* so as to be rotatable. The receiving hole 14*c* also supports the cam plate 13*e* so as to be rotatable.

Figure 14:
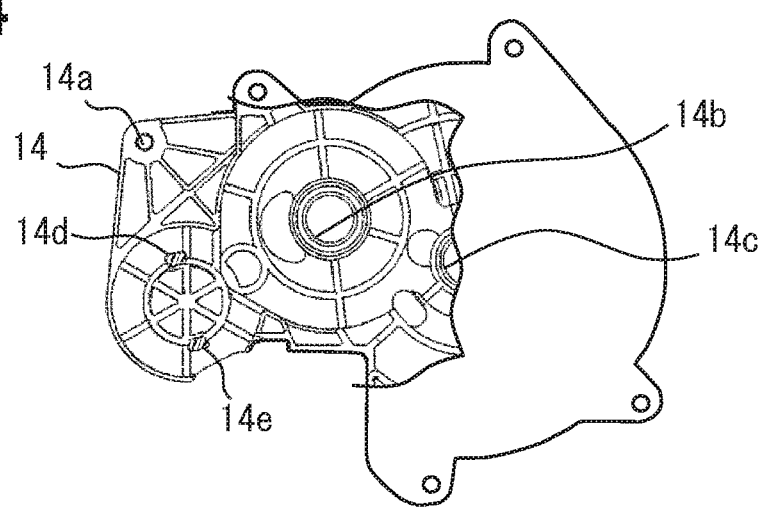
FIG. 14 is a plan view showing an inner surface of the link cover.

FIG. 14 shows the inner surface of the link cover 14. A through hole 14*a*, a receiving hole 14*b*, and a receiving hole 14*c* are also arranged on an inner surface of the link cover 14. Furthermore, the link cover 14 has two protrusions 14*d* and 14*e*. The protrusions 14*d* and 14*e* are disposed on the inner surface of the link cover 14 and in a range facing the first gear 12*a*. The protrusions 14*d* and 14*e* and the link cover 14 are provided by an integral molding method using a continuous resin. The first gear 12a has a plurality of movable stopper surfaces which face the rotation direction of the first gear 12a. The first gear 12a has four movable stopper surfaces. The protrusions 14d and 14e provide a plurality of stationary stopper surfaces facing the rotation direction of the first gear 12a. As a result, the link cover 14 provides four stationary stopper surfaces. The movable stopper surface and the stationary stopper surface are in contact with at one end and the other end in the rotation direction of the first gear 12a.

Figure 15:
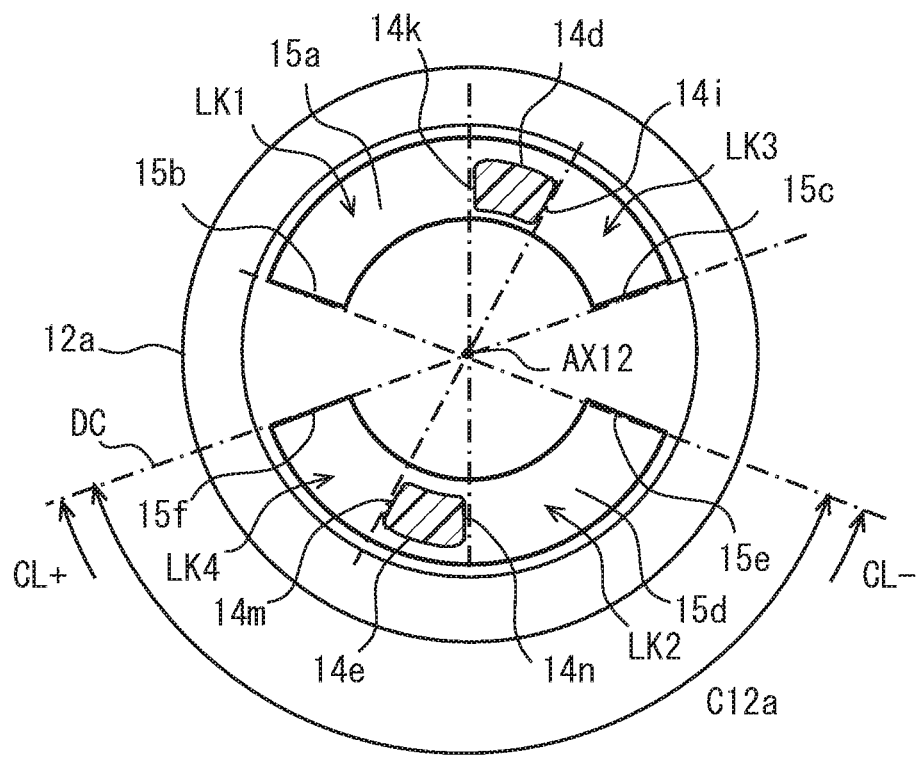
FIG. 15 is a plan view showing a lock mechanism of a first embodiment.

FIG. 15 shows a positional relationship between the protrusions 14d and 14e and the first gear 12a. FIG. 15 shows a plan view of the first gear 12a and cross sections of the protrusions 14d and 14e. The first gear 12a can reversibly rotate in the clockwise direction CL+ and the counterclockwise direction CL−.

The power transmission device 10 includes a plurality of lock mechanisms LK1 and LK2 which stop the first gear 12a at one end in the rotation direction of the first gear 12a. The power transmission device 10 includes a plurality of lock mechanisms LK1 and LK2 for one end of the first gear 12a in the rotational direction. The power transmission device 10 includes a plurality of lock mechanisms LK3 and LK4 which stop the first gear 12a at the other end in the rotation direction of the first gear 12a. The power transmission device 10 includes a plurality of lock mechanisms LK3 and LK4 for the other end of the first gear 12a in the rotational direction.

The plurality of lock mechanisms disposed for one end stops the rotation of the first gear 12a by contacts of the first gear 12a and the link cover 14 at a plurality of separated portions. The plurality of lock mechanisms provided for one end include one lock mechanism and another lock mechanism. One lock mechanism makes one movable stopper surface disposed on the first gear 12a and one stationary stopper surface disposed on the link cover 14 come in contact with in the rotation direction. The other lock mechanism makes the other movable stopper surface disposed on the first gear 12a and the other stationary stopper surface disposed on the link cover 14 come in contact with in the rotation direction. One lock mechanism defines a rotation range by interference between the rotatable member and the stationary member.

The first gear 12a has grooves 15a and 15d in arcuate shapes. The protrusions 14d and 14e are located in the grooves 15a and 15d. In the axial direction along a rotation axis AX12 of the first gear 12a, protrusions 14d and 14e protrude so as to enter the grooves 15a and 15d. Therefore, the protrusions 14d and 14e are in contact with the first gear 12a at both ends of the grooves 15a and 15d. In other words, the protrusions 14d and 14e collide with the first gear 12a at both ends of the grooves 15a and 15d. The lock mechanism includes grooves 15a and 15d disposed on the first gear 12a and protrusions 14d and 14e arranged on the link cover 14 and disposed in the grooves 15a and 15d.

An arc-shaped groove 15a provides two movable stopper surfaces 15b and 15c which face the rotation direction of the first gear 12a. Portions providing the movable stopper surfaces 15b and 15c are also radial ribs provided on the first gear 12a. The ribs of the first gear 12a are members that provide the movable stopper surfaces 15b and 15c. The movable stopper surface 15b faces the clockwise direction CL+. The movable stopper surface 15c faces the counterclockwise direction CL−. An arc-shaped groove 15d provides two movable stopper surfaces 15e and 15f which face the rotation direction of the first gear 12a. Portions providing the movable stopper surfaces 15e and 15f are also radial ribs provided on the first gear 12a. The ribs of the first gear 12a are members that provide the movable stopper surfaces 15e and 15f. The movable stopper surface 15e faces the clockwise direction CL+. The movable stopper surface 15f faces the counterclockwise direction CL−. The movable stopper surfaces 15b, 15c, 15e, and 15f are provided by reinforcing ribs provided on the first gear 12a.

The protrusion 14d has stationary stopper surfaces 14i and 14k at both ends in the rotation direction of the first gear 12a. The stationary stopper surface 14i faces the clockwise direction CL+. The stationary stopper surface 14k faces the counterclockwise direction CL−.

The protrusion 14e has stationary stopper surfaces 14m and 14n at both ends in the rotation direction of the first gear 12a. The stationary stopper surface 14m faces the clockwise direction CL+. The stationary stopper surface 14n faces the counterclockwise direction CL−.

The first gear 12a can rotate beyond the angular range C12a. However, the rotatable range of the first gear 12a is limited to the angular range C12a by the protrusions 14d and 14e and the grooves 15a and 15d. The angular range C12a is less than 180 degrees.

The first gear 12a stops at one end in the rotation direction. The movable stopper surface 15b and the stationary stopper surface 14k are in contact at one end. This state is called a lock state. The movable stopper surface 15b and the stationary stopper surface 14k provide a first lock mechanism LK1 for stopping the rotation of the first gear 12a. The movable stopper surface 15e and the stationary stopper surface 14n are in contact at one end. This state is called a locked state. The movable stopper surface 15e and the stationary stopper surface 14n provide a second lock mechanism LK2 for stopping the rotation of the first gear 12a.

Accordingly, the two lock mechanisms LK1 and LK2 stop the rotation of the first gear 12a at one end. In other words, at one angular position of the first gear 12a, i.e., a first angular position, the two lock mechanisms LK1 and LK2 perform lock states, and stop the rotation of the first gear 12a. Even if the first gear 12a tries to rotate beyond one end, the two lock mechanisms LK1 and LK2 prevent the rotation. As a result, the stress is distributed to the two lock mechanisms LK1 and LK2. Therefore, a damage of the first gear 12a and a damage of the link cover 14 are suppressed.

The fixed stopper surface 14k providing the first lock mechanism LK1 and the stationary stopper surface 14n providing the second lock mechanism LK2 are located on the diagonal line of the first gear 12a. In other words, the stationary stopper surface 14k providing the first lock mechanism LK1 and the stationary stopper surface 14n providing the second lock mechanism LK2 are located on one diameter line of the first gear 12a. The movable stopper surface 15b providing the first lock mechanism LK1 and the movable stopper surface 15e providing the second lock mechanism LK2 are located on a diagonal line of the first gear 12a. In other words, the movable stopper surface 15b providing the first lock mechanism LK1 and the movable stopper surface 15e providing the second lock mechanism LK2 are located on one diameter line of the first gear 12a. For this reason, the two lock mechanisms LK1 and LK2 are located on a single diameter line with respect to the rotation axis AX12.

The first gear 12a may further rotate from a state where the movable stopper surface 15b and the stationary stopper surface 14k are in contact with each other and the movable stopper surface 15b and the stationary stopper surface 14k are in contact with each other. In this case, the two lock mechanisms LK1 and LK2 generate two moments around the rotation axis AX12. The two moments around the rotation axis AX12 suppress the moment which cause a parallel movement of the rotation axis AX12. As a result, a deformation of the first gear 12a or a parallel movement of the first gear 12a is suppressed. Further, a meshing failure between the first gear 12a and the intermediate gear 12b is suppressed. Furthermore, a moment around the rotation axis AX12 acts on the link cover 14. For this reason, a loosening of a screw is suppressed.

When only one of the first lock mechanism LK1 and the second lock mechanism LK2 is provided, contact occurs at one place away from the rotation axis AX12. A contact at only one lock mechanism generates a moment in a direction of a parallel movement of the first gear 12a. For this reason, there exists a possibility of producing a deformation of the first gear 12a, or a parallel movement of the first gear 12a. Further, there is a possibility that a meshing failure between the first gear 12a and the intermediate gear 12b may occur. Furthermore, a contact at only one lock mechanism generates a moment that rotates the link cover 14 relative to the fixing portion. This moment may cause loosening of the screw.

The first gear 12a stops at the other end in the rotation direction. The movable stopper surface 15c and the stationary stopper surface 14i are in contact at the other end. This state is called a locked state. The movable stopper surface 15c and the stationary stopper surface 14i provide a third lock mechanism LK3 for stopping the rotation of the first gear 12a. The movable stopper surface 15f and the stationary stopper surface 14m are in contact at the other end. This state is called a locked state. The movable stopper surface 15f and the stationary stopper surface 14m provide a fourth lock mechanism LK4 for stopping the rotation of the first gear 12a.

Accordingly, the two lock mechanisms LK3 and LK4 stop the rotation of the first gear 12a at the other end. In other words, at one angular position of the first gear 12a, i.e., a second angular position, the two lock mechanisms LK perform the lock state, and stop the rotation of the first gear 12a. Even if the first gear 12a tries to rotate beyond the other end, the two lock mechanisms LK3 and LK4 prevent the rotation. As a result, the stress is distributed to the two lock mechanisms LK3 and LK4. Therefore, the damage of the first gear 12a and the damage of the link cover 14 are suppressed.

The stationary stopper surface 14i providing the third lock mechanism LK3 and the stationary stopper surface 14m providing the fourth lock mechanism LK4 are located on the diagonal line of the first gear 12a. In other words, the stationary stopper surface 14i providing the third lock mechanism LK3 and the stationary stopper surface 14m providing the fourth lock mechanism LK4 are located on one diameter line of the first gear 12a. The movable stopper surface 15c providing the third lock mechanism LK3 and the movable stopper surface 15f providing the fourth lock mechanism LK4 are located on a diagonal line of the first gear 12a. In other words, the movable stopper surface 15c providing the third lock mechanism LK3 and the movable stopper surface 15f providing the fourth lock mechanism LK4 are located on one diameter line of the first gear 12a. For this reason, the two lock mechanisms LK3 and LK4 are located on a single diameter line with respect to the rotation axis AX12.

The first gear 12a may further rotate from a state where the movable stopper surface 15c and the stationary stopper surface 14i are in contact with each other and the movable stopper surface 15f and the stationary stopper surface 14m are in contact with each other. In this case, the two lock mechanisms LK3 and LK4 generate two moments around the rotation axis AX12. The two moments around the rotation axis AX12 suppress the moment that moves the rotation axis AX12 in parallel. As a result, deformation of the first gear 12a or a parallel movement of the first gear 12a is suppressed. Further, a meshing failure between the first gear 12a and the intermediate gear 12b is suppressed. Furthermore, a moment around the rotation axis AX12 acts on the link cover 14. For this reason, a loosening of a screw is suppressed.

When only one of the third lock mechanism LK3 and the fourth lock mechanism LK4 is provided, contact occurs at one place away from the rotation axis AX12. A contact at only one lock mechanism generates a moment in a direction of a parallel movement of the first gear 12a. For this reason, there exists a possibility of producing a deformation of the first gear 12a, or a parallel movement of the first gear 12a. Further, there is a possibility that a meshing failure between the first gear 12a and the intermediate gear 12b may occur. Furthermore, contact in only one lock mechanism creates a moment that rotates the link cover 14 relative to the fixing portion. This moment can cause loosening of the screw.

Figure 16:
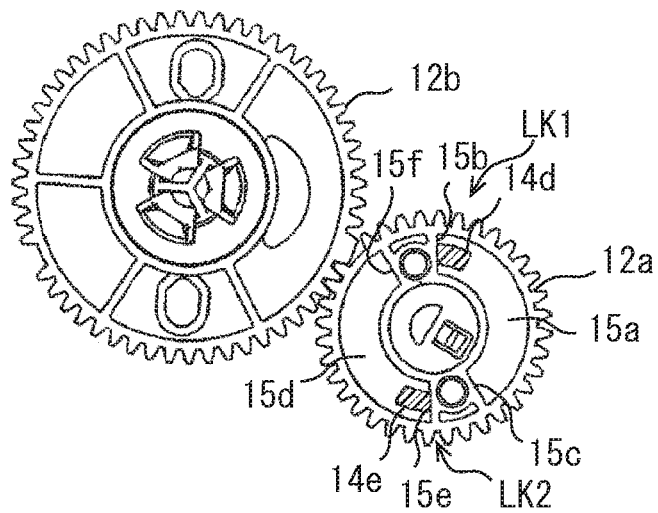
FIG. 16 is a plan view showing a gear at one end.

FIG. 16 shows the first gear 12a and the intermediate gear 12b at one end. One end is also called an inside air lock position. The inside/outside air door 7 closes the outside air inlet 5 and opens the inside air inlet 6 at the inside air lock position.

Figure 17:
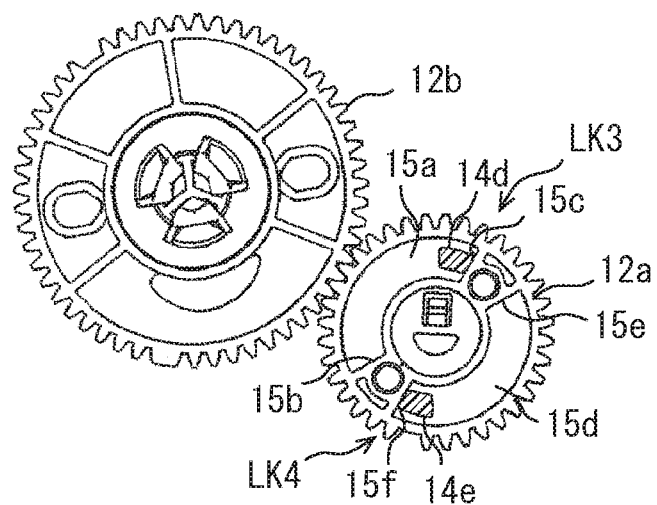
FIG. 17 is a plan view showing the gear at the other end.

FIG. 17 shows the first gear 12a and the intermediate gear 12b at the other end. This other end is also called an outside air lock position. The inside/outside air door 7 opens the outside air inlet 5 and closes the inside air inlet 6 at the outside air lock position.

According to this embodiment, the plurality of locking mechanisms provide a plurality of contacts. The stress when the rotatable member is stopped is distributed to a plurality of contacts. For this reason, stress does not concentrate on one contact part of the rotatable member and the stationary member. The stress applied to one contact is suppressed. The dispersion of the stress suppresses the deformation of the rotating member or the stationary member.

According to this embodiment, a plurality of lock mechanisms for the first gear 12a which is the rotatable member in the power transmission device 10 is provided. At one end in the rotation direction, a plurality of lock mechanisms provide the lock state. For this reason, the stress is dispersed. In one aspect, the weight of the member can be reduced. In another aspect, damage to the member is suppressed. In another aspect, durability of a member can be improved.

The two lock mechanisms LK are arranged on one diameter of the rotatable member (first gear 12a). Therefore, the plurality of lock mechanisms are arranged at equiangular intervals around the rotation axis AX12. In other words, the plurality of lock mechanisms are arranged on one diameter DC of the first gear 12a. In this case, the plurality of lock mechanisms LK generate only a moment around the rotation axis of the rotation member. Therefore, a deformation or a parallel movement of the rotatable member and/or the stationary member (link cover 14) is suppressed.

Second Embodiment

This embodiment is a modified example based on the preceding embodiment. In the above embodiment, the two lock mechanisms in one end or the other end are arranged on one diameter. Alternatively, the two locking mechanisms may be arranged to generate a resultant force in the lock state.

Figure 18:
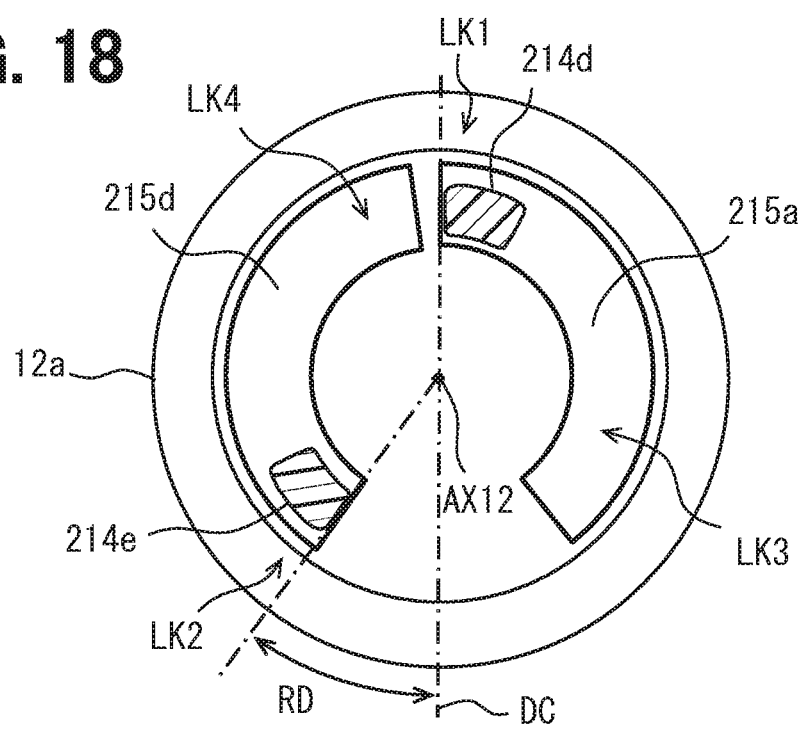
FIG. 18 is a plan view showing a lock mechanism of a second embodiment.

FIG. 18 shows the first gear 212a and the protrusions 214d and 214e in this embodiment. The two locking mechanisms LK1 and LK2 for one end are shifted from the single diameter DC by a shift angle RD. The two lock mechanisms LK3 and LK4 for the other end also deviate from the single diameter DC by a deviation angle RD. In other words, the plurality of lock mechanisms are displaced by a deviation angle RD from an angle (180 degrees) for arranging the plurality of lock mechanisms at equal intervals. In this case, the two lock mechanisms LK1 and LK2 generate a resultant force on the first gear 12a and the link cover 14. The resultant force may cause a parallel movement of the rotation shaft AX12.

By adjusting angular positions of the plurality of lock mechanisms LK1, LK2 with respect to the rotation axis AX12, the direction of the resultant force applied to the gear at the time of locking can be arbitrarily set. The direction of the resultant force is a combined direction of reaction forces generated by the plurality of lock mechanisms LK1 and LK2. The angular positions may be set so that, for example, the first gear 12a is moved only in the direction of reducing the inter gear distance.

Other Embodiments

The disclosure in this specification is not limited to the illustrated embodiment. The disclosure encompasses the illustrated embodiments and modifications by those skilled in the art based thereon. For example, the disclosure is not limited to the parts and/or combinations of elements shown in the embodiments. The disclosure may be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above embodiment, the power transmission device 10 is applied to the air-conditioning device 1. Alternatively, the power transmission device 10 may be applied to various uses. The power transmission device 10 may be applied to, for example, a device that moves parts of a vehicle with a motor. The power transmission device 10 may be applied to a device that moves a mirror, a sheet, and the like, for example. The power transmission device 10 can be applied to a movable device other than a vehicle.

In the above embodiment, the power transmission device 10 provides the lock state at both ends in the rotation direction. That is, one lock mechanism is arranged at one end in the rotation direction, and the other one lock mechanism is arranged at the other end in the rotation direction. Alternatively, the power transmission device 10 may provide the lock state only at any one end in the rotation direction. The power transmission device 10 may be configured, for example, such that only the lock state due to a collision at two places illustrated in FIG. 15 is realized. In this case, the power transmission device 10 may be configured such that a collision state does not occur or the lock state by a collision at one position occurs at the end portion illustrated in FIG. 16. Even in this case, an effect of the above-described embodiment may be obtained at one end portion in the rotation direction.

In the above-described embodiment, the power transmission device 10 provides all the lock mechanisms by the first gear 12a and the related member thereof. The related member is the link plate 14. Alternatively, the lock mechanism may be provided on another rotatable member and related members in the power transmission device 10. For example, the lock mechanism may be provided in the intermediate gear 12b, which is another gear in the gear train 12, or the final gear 12c. The lock mechanism may be provided on the cam plate 13e which is an element of the cam mechanism 13. The lock mechanism may be provided on a gear and/or a cam plate in the power transmission device 10.

Further, the plurality of lock mechanisms may be distributed on the plurality of rotatable members. For example, the power transmission device 10 may provide a first lock mechanism at one end in the rotation direction by the first gear 12a, and may provide a second lock mechanism at the other end in the rotation direction by the intermediate gear 12b. In this case, the power transmission device 10 may be arranged to dispose the movable stopper surface and the stationary stopper surface over a wide range in a dispersed manner.

In the above embodiment, the plurality of lock mechanisms LK1, LK2, LK3, and LK4 are formed between the first gear 12a and the link plate 14. In other words, all of the plurality of lock mechanisms are arranged on one side of the first gear 12a. Alternatively, both surfaces of the first gear 12a, i.e., the rotatable member may be used. For example, the plurality of lock mechanisms LK1 and LK2 for one end may be arranged between the first gear 12a and the link plate 14. In this case, the plurality of lock mechanisms LK3 and LK4 for the other end may be arranged between the first gear 12a and the case 17 or between the first gear 12a and the motor 11.

In the above embodiment, the power transmission device 10 has two lock mechanisms in one end or the other end. Alternatively, the power transmission device 10 may have a plurality of lock mechanisms such as three or four at one end or the other end. When the power transmission device 10 includes three lock mechanisms, the three lock mechanisms are arranged at equal intervals at intervals of 120 degrees in angle. When the power transmission device 10 has four lock mechanisms, the four lock mechanisms are arranged at equal intervals at intervals of 90 degrees. As described above, the plurality of lock mechanisms for defining one end portion may be arranged at equal intervals.

In the above embodiment, the first gear 12a has a groove, and the link cover 14 has a protrusion. Alternatively, the first gear 12a may have a protrusion, and the link cover 14 may have a groove. Even with this configuration, it is possible to provide a plurality of movable stopper surfaces and a plurality of stationary stopper surfaces which cause collisions in the rotation direction of the first gear 12a. Further, the plurality of movable stopper surfaces and the plurality of stationary stopper surfaces may be provided by protrusions disposed on the first gear 12a and protrusions disposed on the link cover 14.

In the above embodiment, the power transmission device 10 has a plurality of stationary stopper surfaces on the stationary link cover 14. Alternatively, the power transmission device 10 may have a stationary stopper surface on a stationary member other than the link cover 14. The power transmission device 10 may have, for example, one protrusion 14d disposed on the link cover 14 and another protrusion 14e disposed on the bracket of the servo motor that provides the motor 11.

In the above embodiment, the power transmission device 10 has the single intermediate gear 12c between the first gear 12a and the final gear 12c. Alternatively, the power transmission device 10 may have a plurality of intermediate gears. In the above embodiment, the gears 12a, 12b, and 12c have teeth on the entire circumference. Alternatively, the gear may have teeth only in a necessary range. For example, the rotatable member may be provided by a geared plate extending in a fan shape from the rotation axis.

What is claimed is:

1. An air-conditioning device comprising:
a door which controls a flow of air; and
a power transmission device including a power source which generates power for moving the door, wherein
the power transmission device further includes:
a rotatable member which is rotatable,
a stationary member arranged adjacent to the rotatable member, and
a plurality of lock mechanisms configured to stop a rotation of the rotatable member, wherein the plurality of lock mechanisms are formed by a plurality of contacts between the rotatable member and the stationary member, wherein the plurality of lock mechanisms stop the rotatable member at an end of rotation of the rotatable member in a first direction and at another end of rotation of the rotatable member in a second direction opposite to the first direction, wherein
the rotatable member is a gear that is configured to mesh with a second gear, and
the plurality of lock mechanisms are arranged at equiangular intervals around a rotation axis of the rotatable member.

2. The air-conditioning device claimed in claim 1, wherein
the plurality of lock mechanisms are arranged on one diameter of the rotatable member.

3. The air-conditioning device claimed in claim 1, wherein
the plurality of lock mechanisms include:
a groove disposed on the rotatable member; and
a protrusion disposed on the stationary member and arranged in the groove.

4. The air-conditioning device claimed in claim 1, wherein
the device further comprises a gear train having at least the gear, the second gear, and a final gear meshing with the second gear, and wherein
the stationary member is a link cover which covers the gear train.

5. The air-conditioning device claimed in claim 1, wherein
the stationary member covers the rotatable member.

6. An air-conditioning device comprising:
a door which controls a flow of air; and
a power transmission device including a power source which generates power for moving the door, wherein
the power transmission device further includes:
a rotatable member which is rotatable,
a stationary member arranged adjacent to the rotatable member, and
a plurality of lock mechanisms configured to stop a rotation of the rotatable member, wherein the plurality of lock mechanisms are formed b a plurality of contacts between the rotatable member and the stationary member, wherein the plurality of lock mechanisms stop the rotatable member at an end of rotation of the rotatable member in a first direction and at another end of rotation of the rotatable member in a second direction opposite to the first direction, wherein
the rotatable member is a gear that is configured to mesh with a second gear,
the plurality of lock mechanisms includes:
one movable stopper surface disposed on the rotatable member comes into contact with one stationary stopper surface disposed on the stationary member in the first direction of rotation, and
another movable stopper surface disposed on the rotatable member comes into contact with another stationary stopper surface disposed on the stationary member in the second direction of rotation.

7. The air-conditioning device claimed in claim 6, wherein
the one movable stopper surface is provided by a rib disposed on the rotatable member.

8. The air-conditioning device claimed in claim 6, wherein
the plurality of lock mechanisms include:
a groove disposed on the rotatable member; and
a protrusion disposed on the stationary member and arranged in the groove.

9. The air-conditioning device claimed in claim 6, wherein
the device further comprises a gear train having at least the gear, the second gear, and a final gear meshing with the second gear, and wherein
the stationary member is a link cover which covers the gear train.

10. The air-conditioning device claimed in claim 6, wherein
the stationary member covers the rotatable member.

11. An air-conditioning device comprising:
a door which controls a flow of air; and
a power transmission device including a power source which generates power for moving the door, wherein
the power transmission device further includes:
a rotatable member which is rotatable,
a stationary member arranged adjacent to the rotatable member, and
a plurality of lock mechanisms configured to stop a rotation of the rotatable member, wherein the plurality of lock mechanisms are formed by a plurality of contacts between the rotatable member and the stationary member wherein
the rotatable member is a gear that is configured to mesh with a second gear,
the device further comprises a gear train having at least the gear, the second gear, and a final gear meshing with the second gear, wherein
the stationary member is a link cover which covers the gear train,
the door is an inside/outside air door which switches between an inside air inlet and an outside air inlet, and wherein
the power source is a motor, and:
a first group of lock mechanisms of the plurality of lock mechanisms stops the gear in a clockwise rotation direction of the gear; and a second group of lock mechanisms of the plurality of lock mechanisms stops the gear in a counter clockwise rotation direction of the gear.

12. The air-conditioning device claimed in claim 11, wherein
the plurality of lock mechanisms include:
a groove disposed on the rotatable member; and
a protrusion disposed on the stationary member and arranged in the groove.

* * * * *